US012785461B2

(12) United States Patent
Tangudu et al.

(10) Patent No.: US 12,785,461 B2
(45) Date of Patent: Nov. 3, 2026

(54) MAGNETIC WIRE INFUSED COMPONENTS FOR ELECTRIC MACHINE

(71) Applicants: Hamilton Sundstrand Corporation, Charlotte, NC (US); Iowa State University Research Foundation, Inc., Ames, IA (US)

(72) Inventors: Jagadeesh K. Tangudu, South Windsor, CT (US); Jun Cui, Ames, IA (US)

(73) Assignees: IOWA STATE UNIVERSITY RESEARCH FOUNDATION, INC., Ames, IA (US); RTX CORPORATION, Arlington, VA (US)

( * ) Notice: Subject to any disclaimer, the term of this patent is extended or adjusted under 35 U.S.C. 154(b) by 271 days.

(21) Appl. No.: 18/486,912

(22) Filed: Oct. 13, 2023

(65) Prior Publication Data

US 2024/0195233 A1 Jun. 13, 2024

Related U.S. Application Data

(60) Provisional application No. 63/432,255, filed on Dec. 13, 2022.

(51) Int. Cl.
*H02K 1/02* (2006.01)
*B64D 27/24* (2024.01)
(Continued)

(52) U.S. Cl.
CPC ............... *H02K 1/02* (2013.01); *B64D 27/24* (2013.01); *H02K 1/16* (2013.01); *H02K 1/2786* (2013.01)

(58) Field of Classification Search
CPC ......... H02K 16/02; H02K 3/02; H02K 1/2786
See application file for complete search history.

(56) References Cited

U.S. PATENT DOCUMENTS 5,172,020 A * 12/1992 Hibino ..................... H02K 1/02 335/215
8,058,754 B2 * 11/2011 Roeckelein ............ H02K 41/00 310/12.25

(Continued)

FOREIGN PATENT DOCUMENTS

CN 103537683 A * 1/2014 ................ B22F 1/00
CN 108718120 A 8/2018

(Continued)

OTHER PUBLICATIONS

WO2007132768A1—Translation (Year: 2025).*

(Continued)

*Primary Examiner* — Christopher M Koehler
*Assistant Examiner* — Ahmed F Seck
(74) *Attorney, Agent, or Firm* — CANTOR COLBURN LLP

(57) ABSTRACT

Aircraft electric motors include a rotor having a plurality of magnet segments arranged on a frame of the rotor, the rotor defining an internal cavity radially inward from the plurality of magnet segments, an output shaft operably coupled to the rotor, and a stator having a support structure and at least one winding wrapped about a plurality of stator teeth. The stator teeth include inner teeth arranged on a radially inward side of the support structure and outer teeth arranged on a radially outward side of the support structure and the stator is arranged within the internal cavity of the rotor. At least one of the inner teeth, the outer teeth, or the support structure is formed from a non-magnetic material with embedded magnetic wires.

20 Claims, 13 Drawing Sheets

(51) Int. Cl.
*H02K 1/16* (2006.01)
*H02K 1/2786* (2022.01)

(56) References Cited

U.S. PATENT DOCUMENTS

| | | | | |
|---|---|---|---|---|
| 2004/0031620 | A1* | 2/2004 | Lerchenmueller | H01B 3/30 |
| 2004/0245883 | A1* | 12/2004 | Mitcham | H02K 1/02<br>310/216 |
| 2009/0189471 | A1* | 7/2009 | Amano | G11B 19/2009<br>310/156.01 |
| 2013/0008688 | A1* | 1/2013 | Nagai | H01B 17/56 |
| 2014/0035426 | A1* | 2/2014 | Cameron | H02K 15/04<br>310/208 |
| 2015/0145351 | A1* | 5/2015 | Porcher | H02K 15/10 |
| 2021/0151228 | A1 | 5/2021 | Sozer et al. | |
| 2022/0320929 | A1* | 10/2022 | Tangudu | H02K 1/30 |

FOREIGN PATENT DOCUMENTS

| | | | | |
|---|---|---|---|---|
| JP | 2005020884 | A | 1/2005 | |
| WO | WO2007132768 | A1 * | 11/2007 | H02K 16/02 |

OTHER PUBLICATIONS

CN103537683A—Translation (Year: 2025).*
European Search Report for European Application No. 23202206.1; Date of Search Mar. 18, 2024, 8 pages.
U.S. Drive. 2017. "Electrical and Electronics Technical Team Roadmap". Oct. 2017 Retrieved from: https://www.energy.gov/sites/default/files/2017/11/f39/EETT%20Roadmap%2010-27-17.pdf. Retrieved on Apr. 11, 2026, 41 pages.

* cited by examiner

MAGNETIC WIRE INFUSED COMPONENTS FOR ELECTRIC MACHINE

CROSS-REFERENCE TO RELATED APPLICATIONS

This application claims the benefit of U.S. Provisional Application No. 63/432,255 filed Dec. 13, 2022, the disclosure of which is incorporated herein by reference in its entirety.

STATEMENT OF FEDERAL SUPPORT

This invention was made with government support under Government Contract Nos. DE-AR0001351 and DE-AC02-07CH11358, awarded by the Department of Energy. The government has certain rights in the invention.

BACKGROUND

The present disclosure relates to electric motors, and more particularly, to electric motor assemblies with high efficiency and power density having relatively low weight for aircraft applications.

Traditional electric motors may include a stator and a rotor, with electrical motor windings in the stator that, when energized, drive rotation of the rotor about a central axis. Heat is generated in the motor windings, which are located in slots in the stator. The windings are separated from the exterior of the motor by layers of insulation and laminated steel, which makes up the stator. These contributors to internal thermal resistance limit the allowable heat generation and thus the allowable electrical current in the windings. The energy density of an electric motor is typically limited by heat dissipation from the motor windings of the stator. The requirement to be met is a maximum hot spot temperature in the motor windings that is not to be exceeded. Conventional motor thermal management includes natural convection from large fins on the outside of a motor jacket, or liquid cooling in the motor jacket. Both of these solutions undesirably add volume and/or weight to the motor, due to the addition of, at least, the jacket.

BRIEF DESCRIPTION

According to some embodiments, aircraft electric motors are provided. The aircraft electric motors include a rotor comprising a plurality of magnet segments arranged on a frame of the rotor, the rotor defining an internal cavity radially inward from the plurality of magnet segments, an output shaft operably coupled to the rotor, and a stator comprising a support structure and at least one winding wrapped about a plurality of stator teeth comprising inner teeth arranged on a radially inward side of the support structure and outer teeth arranged on a radially outward side of the support structure, the stator arranged within the internal cavity of the rotor. At least one of the inner teeth, the outer teeth, or the support structure is formed from a non-magnetic material with embedded magnetic wires.

In addition to one or more of the features described herein, or as an alternative, further embodiments of the aircraft electric motors may include that each of the inner teeth, the outer teeth, and the support structure are formed from a non-magnetic material with embedded magnetic wires.

In addition to one or more of the features described herein, or as an alternative, further embodiments of the aircraft electric motors may include that the embedded magnetic wires comprise a silicon steel.

In addition to one or more of the features described herein, or as an alternative, further embodiments of the aircraft electric motors may include that the silicon steel has a composition of one of 3.2% silicon steel or 6.5% silicon steel.

In addition to one or more of the features described herein, or as an alternative, further embodiments of the aircraft electric motors may include that the embedded magnetic wires comprise a cobalt steel.

In addition to one or more of the features described herein, or as an alternative, further embodiments of the aircraft electric motors may include that the non-magnetic material comprises a ceramic.

In addition to one or more of the features described herein, or as an alternative, further embodiments of the aircraft electric motors may include that the non-magnetic material comprises a potting material.

In addition to one or more of the features described herein, or as an alternative, further embodiments of the aircraft electric motors may include that the wires are flat strips of magnetic material.

In addition to one or more of the features described herein, or as an alternative, further embodiments of the aircraft electric motors may include that the flat strips have a thickness of between 20 μm and 100 μm.

In addition to one or more of the features described herein, or as an alternative, further embodiments of the aircraft electric motors may include that the wires have a circular cross-sectional profile.

In addition to one or more of the features described herein, or as an alternative, further embodiments of the aircraft electric motors may include that the wires have a diameter of between 20 μm and 100 μm.

In addition to one or more of the features described herein, or as an alternative, further embodiments of the aircraft electric motors may include that the wires have a diameter of 80% or less than a thickness of the non-magnetic material.

In addition to one or more of the features described herein, or as an alternative, further embodiments of the aircraft electric motors may include that the non-magnetic material with embedded magnetic wires is formed as a stator structure having a rectangular cross-section.

In addition to one or more of the features described herein, or as an alternative, further embodiments of the aircraft electric motors may include that the rectangular cross-section has a width of 10 mm and a height of between 0.5 mm and 10 mm.

In addition to one or more of the features described herein, or as an alternative, further embodiments of the aircraft electric motors may include that the non-magnetic material with embedded magnetic wires comprises wires having a green density of 90% or less of a respective formed structured.

According to some embodiments, aircraft are provided. The aircraft include at least one aircraft electric motor, at least one electrical device, and a power distribution system configured to distribute power from the at least one electric motor to the at least one electrical device. The at least one aircraft electric motor includes a rotor comprising a plurality of magnet segments arranged on a frame of the rotor, the rotor defining an internal cavity radially inward from the plurality of magnet segments, an output shaft operably coupled to the rotor, and a stator comprising a support structure and at least one winding wrapped about a plurality of stator teeth comprising inner teeth arranged on a radially inward side of the support structure and outer teeth arranged on a radially outward side of the support structure, the stator arranged within the internal cavity of the rotor. At least one of the inner teeth, the outer teeth, or the support structure is formed from a non-magnetic material with embedded magnetic wires.

In addition to one or more of the features described herein, or as an alternative, further embodiments of the aircraft may include that each of the inner teeth, the outer teeth, and the support structure are formed from a non-magnetic material with embedded magnetic wires.

In addition to one or more of the features described herein, or as an alternative, further embodiments of the aircraft may include that the embedded magnetic wires comprise at least one of a silicon steel or a cobalt steel.

In addition to one or more of the features described herein, or as an alternative, further embodiments of the aircraft may include that the non-magnetic material comprises at least one or a ceramic or a potting material.

In addition to one or more of the features described herein, or as an alternative, further embodiments of the aircraft may include that the wires are one of (i) flat strips of magnetic material or (ii) wires having a circular cross-sectional profile.

The foregoing features and elements may be combined in various combinations without exclusivity, unless expressly indicated otherwise. Features which are described in the context of separate aspects and embodiments may be used together and/or be interchangeable. Similarly, features described in the context of a single embodiment may also be provided separately or in any suitable subcombination. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

DETAILED DESCRIPTION

Figure 1A:
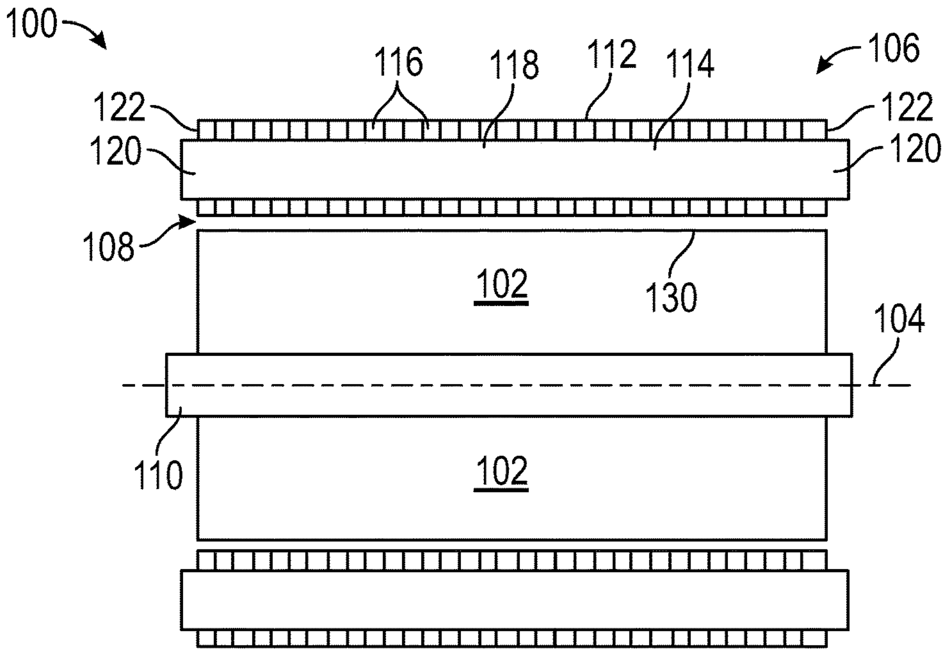
FIG. 1A is a partial view of an embodiment of electric motor.
Figure 1B:
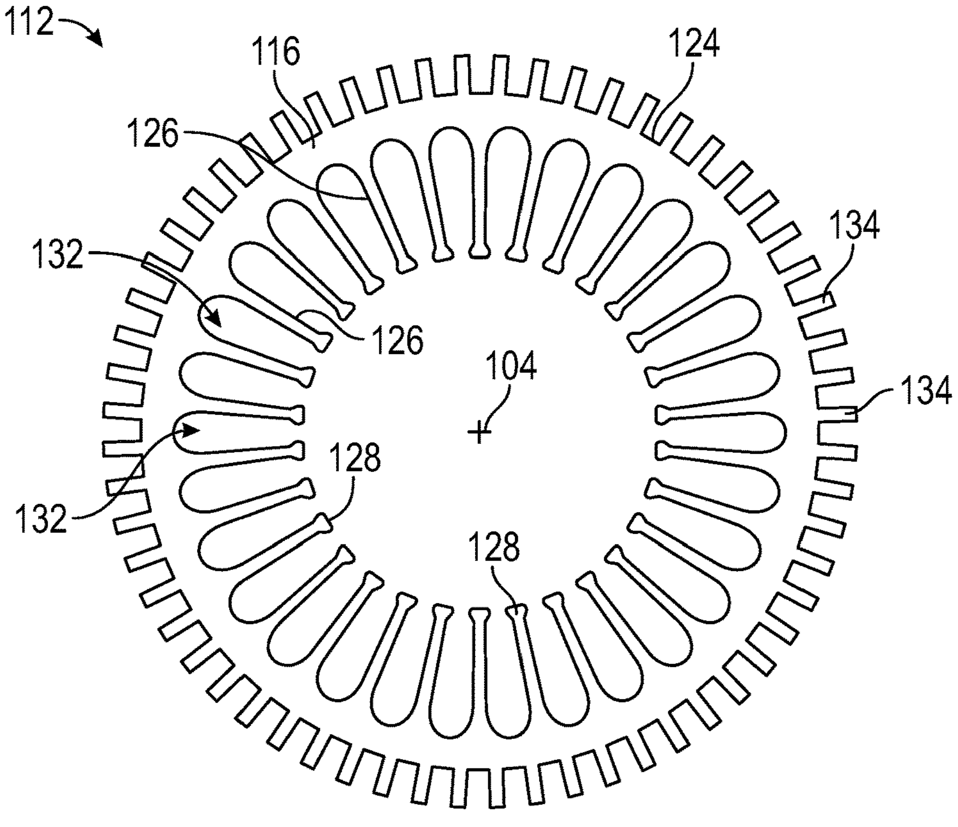
FIG. 1B is a cross-sectional view of an embodiment of a stator core of the electric motor of FIG. 1A.

Referring to FIGS. 1A-1B, schematic illustrations of an electric motor 100 that may incorporate embodiments of the present disclosure are shown. FIG. 1A illustrates a cross-sectional view of the electric motor 100 and FIG. 1B illustrates a cross-sectional view of a stator core of the electric motor 100. The electric motor 100 includes a rotor 102 configured to rotate about a rotation axis 104. A stator 106 is located radially outboard of the rotor 102 relative to the rotation axis 104, with a radial airgap 108 located between the rotor 102 and the stator 106. As illustrated, the rotor 102 may be mounted on a shaft 110 which may impart rotational movement to the rotor 102 or may be driven by rotation of the rotor 102, as will be appreciated by those of skill in the art. The rotor 102 and the shaft 110 may be fixed together such that the rotor 102 and the shaft 110 rotate about the rotation axis 104 together as one piece.

The stator 106 includes a stator core 112 in which a plurality of electrically conductive stator windings 114 are disposed. In some embodiments, such as shown in FIG. 1A, the stator core 112 is formed from a plurality of axially stacked laminations 116, which are stacked along the rotation axis 104. In some embodiments, the laminations 116 are formed from a steel material, but one skilled in the art will readily appreciate that other materials may be utilized. The stator windings 114, as shown, include core segments 118 extending through the stator core 112 and end turn segments 120 extending from each axial stator end 122 of the stator core 112 and connecting circumferentially adjacent core segments 118. When the stator windings 114 are energized via an electrical current therethrough, the resulting field drives rotation of the rotor 102 about the rotation axis 104. Although FIG. 1A illustrates the stator core 112 arranged radially inward from the stator windings 114, it will be appreciated that other configurations are possible without departing from the scope of the present disclosure. For example, in some embodiments, the stator structure may be arranged radially inward from a rotating rotor structure.

FIG. 1B is an axial cross-sectional view of the stator core 112. Each lamination 116 of the stator core 112 includes a radially outer rim 124 with a plurality of stator teeth 126 extending radially inwardly from the outer rim 124 toward the rotation axis 104. Each of the stator teeth 126 terminate at a tooth tip 128, which, together with a rotor outer surface 130 (shown in FIG. 1A) of the rotor 102, may define the radial airgap 108. Circumferentially adjacent stator teeth 126 define an axially-extending tooth gap 132 therebetween. Further, in some embodiments, a plurality of stator fins 134 extend radially outwardly from the outer rim 124.

Electric motors, as shown in FIGS. 1A-1B may require cooling due to high density configurations, various operational parameters, or for other reasons. For example, high-power-density aviation-class electric motors and drives may require advanced cooling technologies to ensure proper operation of the motors/drives. These machines are generally thermally limited at high power ratings and their performance can be improved by mitigating thermal limitations. To maintain desired temperatures, a thermal management system (TMS) is integrated into the system, which provides cooling to components of the system. Onboard an aircraft, power requirements, and thus thermal management system (TMS) loads, are substantially higher during takeoff. Sizing of the TMS for takeoff conditions (i.e., maximum loads) results in a TMS having a high weight to accommodate such loads. This results in greater weight and lower power density during cruise conditions which do not generate such loads, and thus does not require a high cooling capacity TMS. Balancing weight constraints and thermal load capacities is important for such aviation applications.

In view of such considerations, improved aviation electric motors are provided herein. The aviation electric motors or aircraft electric motors, described herein, incorporate lightweight materials and compact design to reduce weight, improve thermal efficiencies, improve power efficiencies, and improve power density.

Figure 2A:
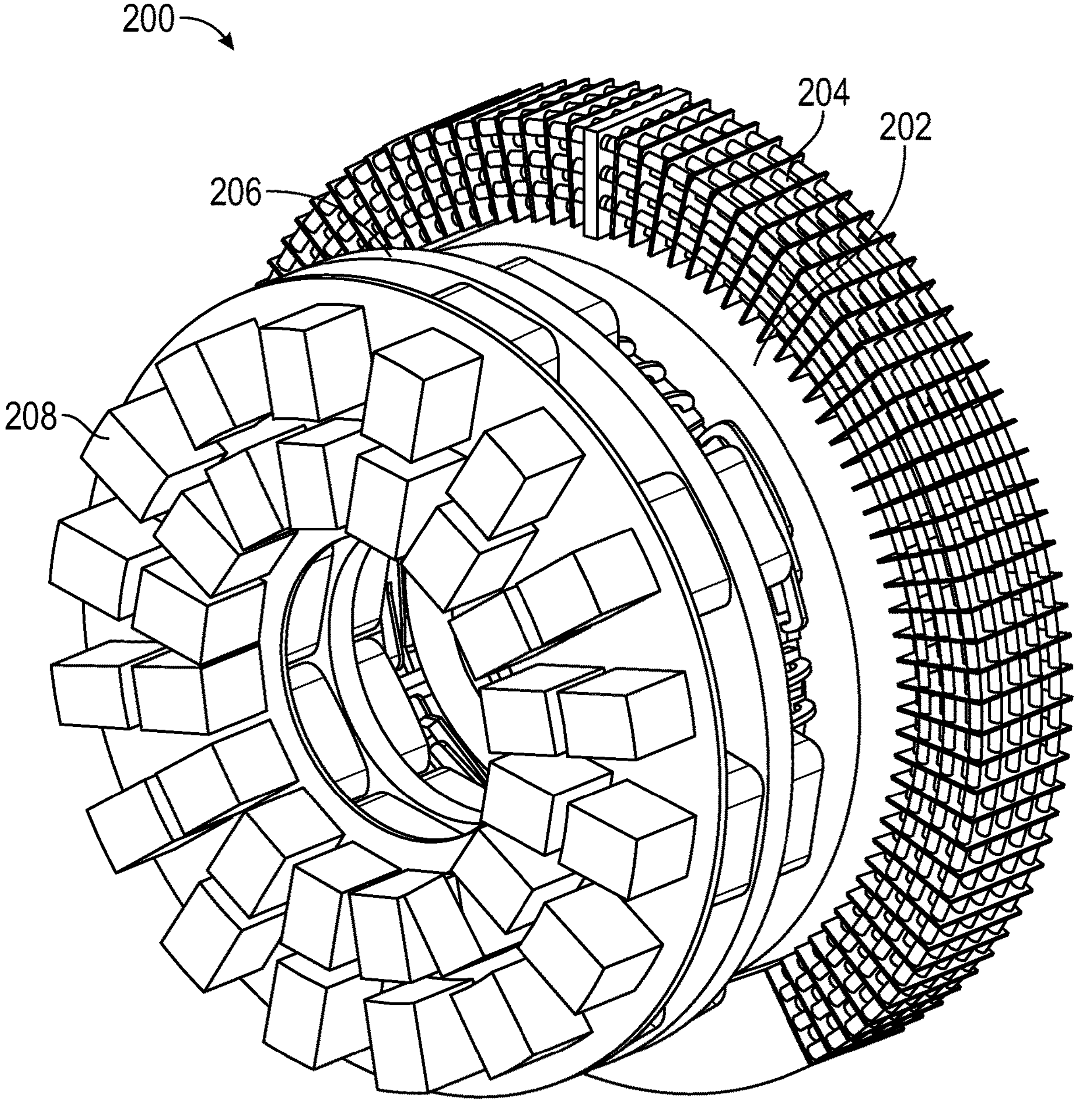
FIG. 2A is a schematic illustration of an aircraft electric motor in accordance with an embodiment of the present disclosure.
Figure 2B:
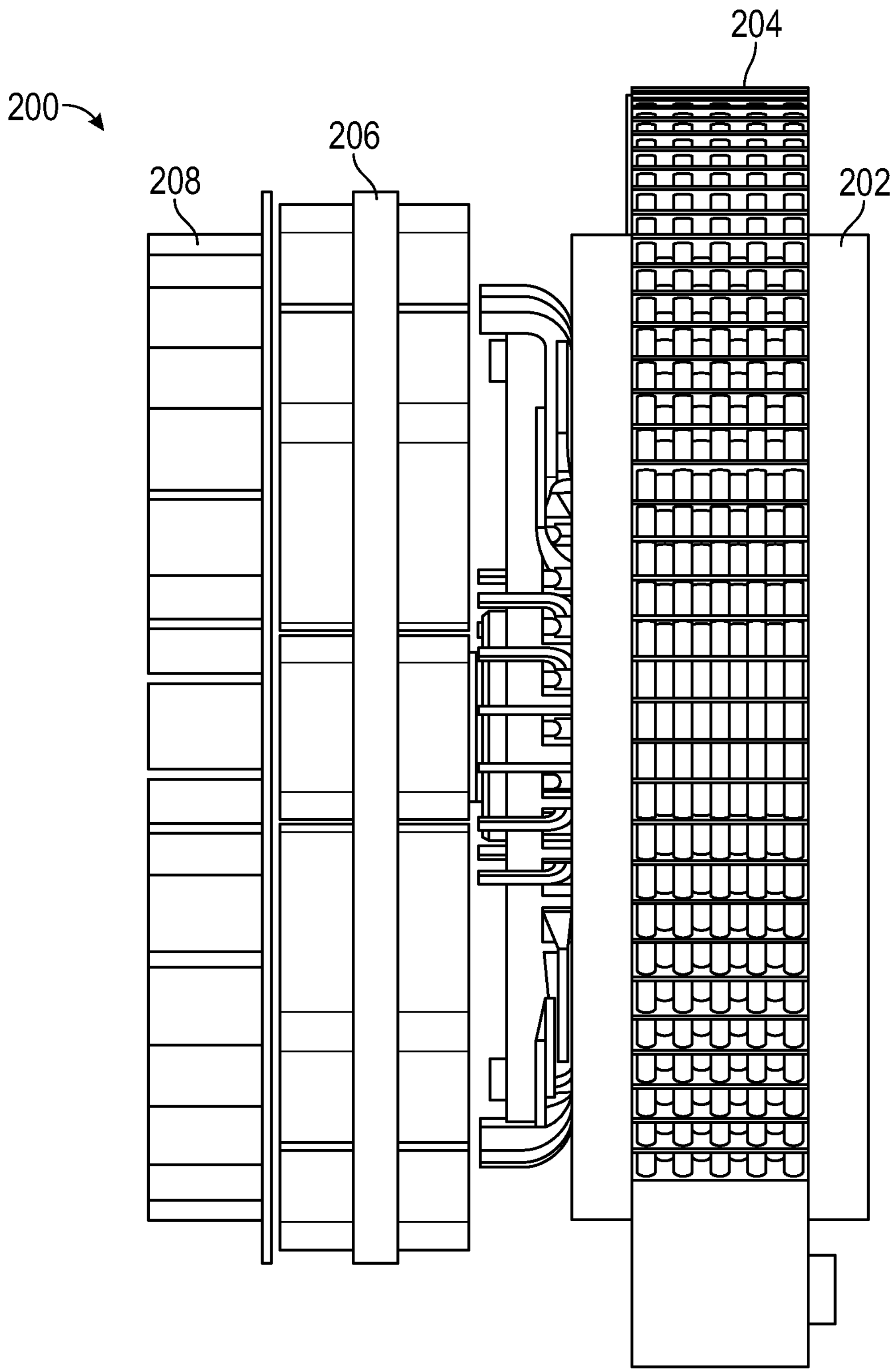
FIG. 2B is a side elevation view of the aircraft electric motor of FIG. 2A.
Figure 2C:
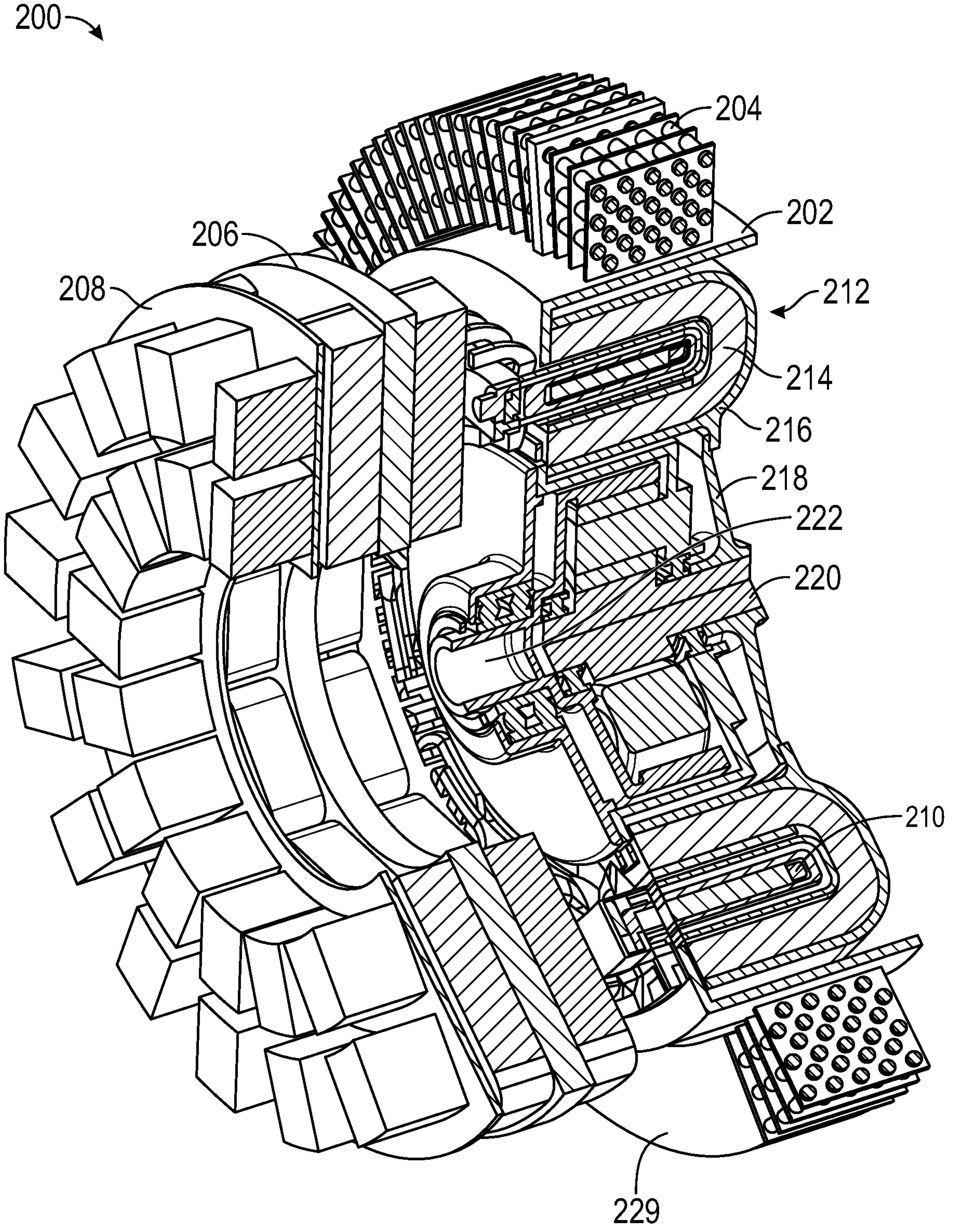
FIG. 2C is a partial cut-away illustration of the aircraft electric motor of FIG. 2A.
Figure 2D:
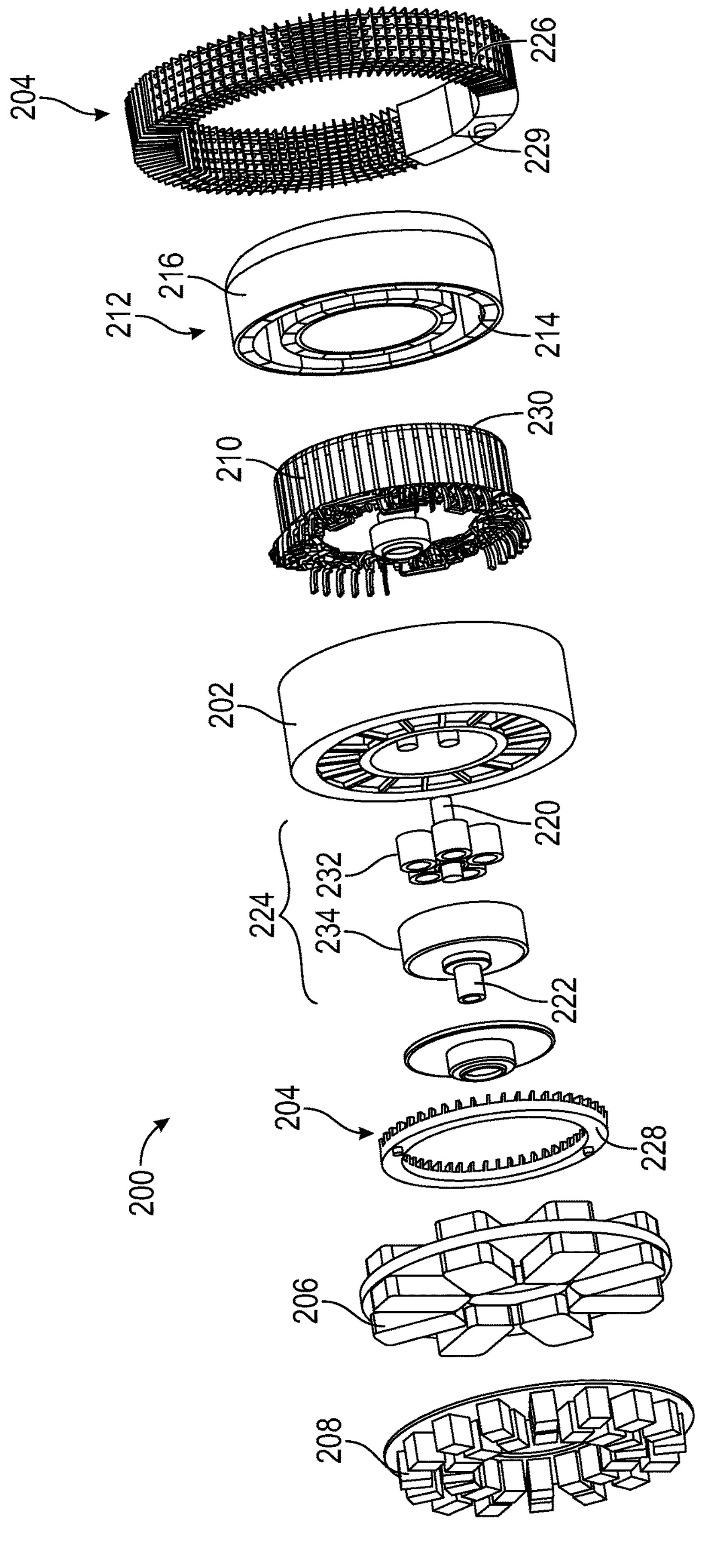
FIG. 2D is a separated-component illustration of the aircraft electric motor of FIG. 2A.

Turning now to FIGS. 2A-2D, schematic illustrations of an aircraft electric motor 200 in accordance with an embodiment of the present disclosure are shown. FIG. 2A is an isometric illustration of the aircraft electric motor 200, FIG. 2B is a side elevation view of the aircraft electric motor 200, FIG. 2C is a partial cut-away view illustrating internal components of the aircraft electric motor 200, and FIG. 2D is a schematic illustration of components of the aircraft electric motor 200 as separated from each other. The aircraft electric motor 200 includes a motor housing 202, a cooling system 204, a first power module system 206, and a second power module system 208.

The motor housing 202 houses a stator 210 and a rotor 212, with the rotor 212 configured to be rotatable about the stator 210. In this illustrative embodiment, the rotor 212 includes a U-shaped magnet 214 arranged within a similarly shaped U-shaped rotor sleeve 216. The rotor sleeve 216 is operably connected to a hub 218. The hub 218 is fixedly attached to a first shaft 220. The first shaft 220 is operably connected to a second shaft 222. In some configurations, the first shaft 220 may be a high speed shaft and may be referred to as an input shaft. In such configurations, the second shaft 222 may be a low speed shaft and may be referred to as an output shaft. The connection between the first shaft 220 and the second shaft 222 may be by a gear assembly 224, as described herein.

The cooling system 204 is configured to provide cooling to the components of the aircraft electric motor 200. The cooling system 204, as shown in FIG. 2D, includes a heat exchanger 226 and a header 228. The heat exchanger 226 and the header 228 may form a closed-loop cooling system that may provide air-cooling to a working fluid at the heat exchanger 226. The header 228 may be, in some configurations, a two-phase di-electric cooling header. A cooled working fluid may be pumped from the heat exchanger 226 into the header 228 using a pump 229 and distributed into embedded cooling channels 230 that are arranged within the stator 210. As the aircraft electric motor 200 is operated, heat is generated and picked up by the working fluid within the embedded cooling channels 230. This heated working fluid is then passed through the header 228 back to the heat exchanger 226 to be cooled, such as by air cooling. Although described as air-cooling, other cooling processes may be employed without departing from the scope of the present disclosure.

As shown, the heat exchanger 226 of the cooling system 204 may be a circular or annular structure that is arranged about the motor housing 202. This configuration and arrangement allows for improved compactness of the system, which may be advantageous for aircraft applications. The rotor sleeve 216 with the magnets 214, the stator 210, and the gear assembly 224 fit together (although moveable relative to each other) within the motor housing 202, providing for a compact (low volume/size) design.

As noted above, the rotor sleeve 216 may be operably coupled to a first shaft 220 by the hub 218. The first shaft 220 may be operably coupled to a first gear element 232 and the second shaft 222 may be operably coupled to a second gear element 234. The first and second gear elements 232, 234 may form the gear assembly 224. The first and second gear elements 232, 234 are arranged to transfer rotational movement from the first shaft 220, which is driven in rotation by the hub 218 and the rotor sleeve 216 of the rotor 212, to the second shaft 222. In some embodiments, the first shaft 220 may be operably connected to a sun gear as the first gear element 232 that engages with a plurality of planetary gears and drives rotation of the second gear element 234 which may be operably connected to the second shaft 222. In some embodiments, the second shaft 222 may be connected to a fan or other component to be rotated by the aircraft electric motor 200.

The aircraft electric motor 200 includes the first power module system 206 and the second power module system 208. The first and second power module systems 206, 208 can include capacitors and other electronics, including, but not limited to, printed circuit boards (PCBs) that are configured to control and operate the aircraft electric motor 200. Again, the profile of the aircraft electric motor 200 of the present disclosure presents a low profile or compact arrangement that reduces the volume of the entire power system, which in turn can provide for improved weight reductions. In some embodiments, the first and second power module systems 206, 208 may be electrically connected to the stator 210 to cause an electric current therein. As the electric current will induce an electromagnetic field which will cause the rotor 212 to rotate.

Figure 3A:
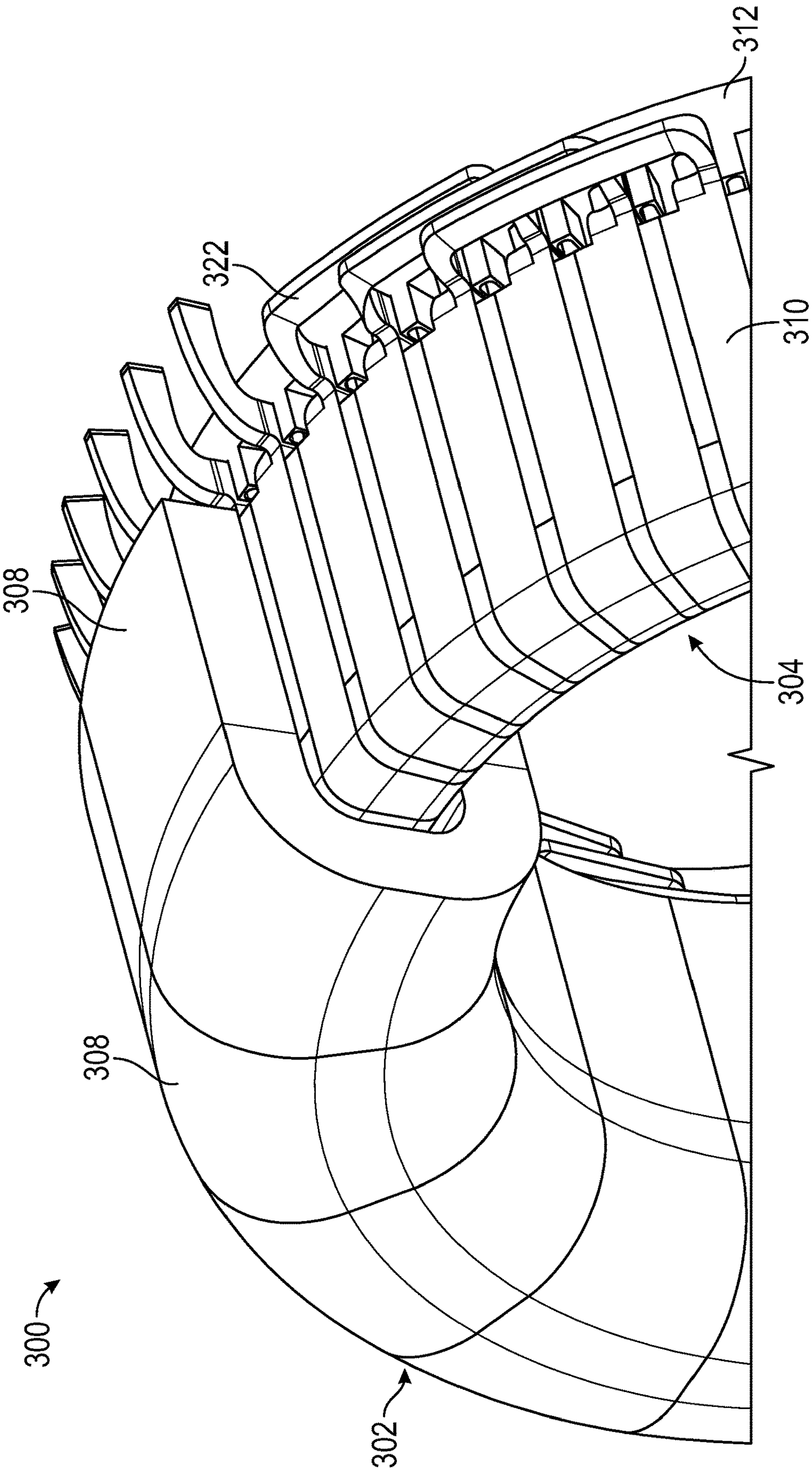
FIG. 3A is a schematic illustration of a rotor and stator of an aircraft electric motor in accordance with an embodiment of the present disclosure.
Figure 3B:
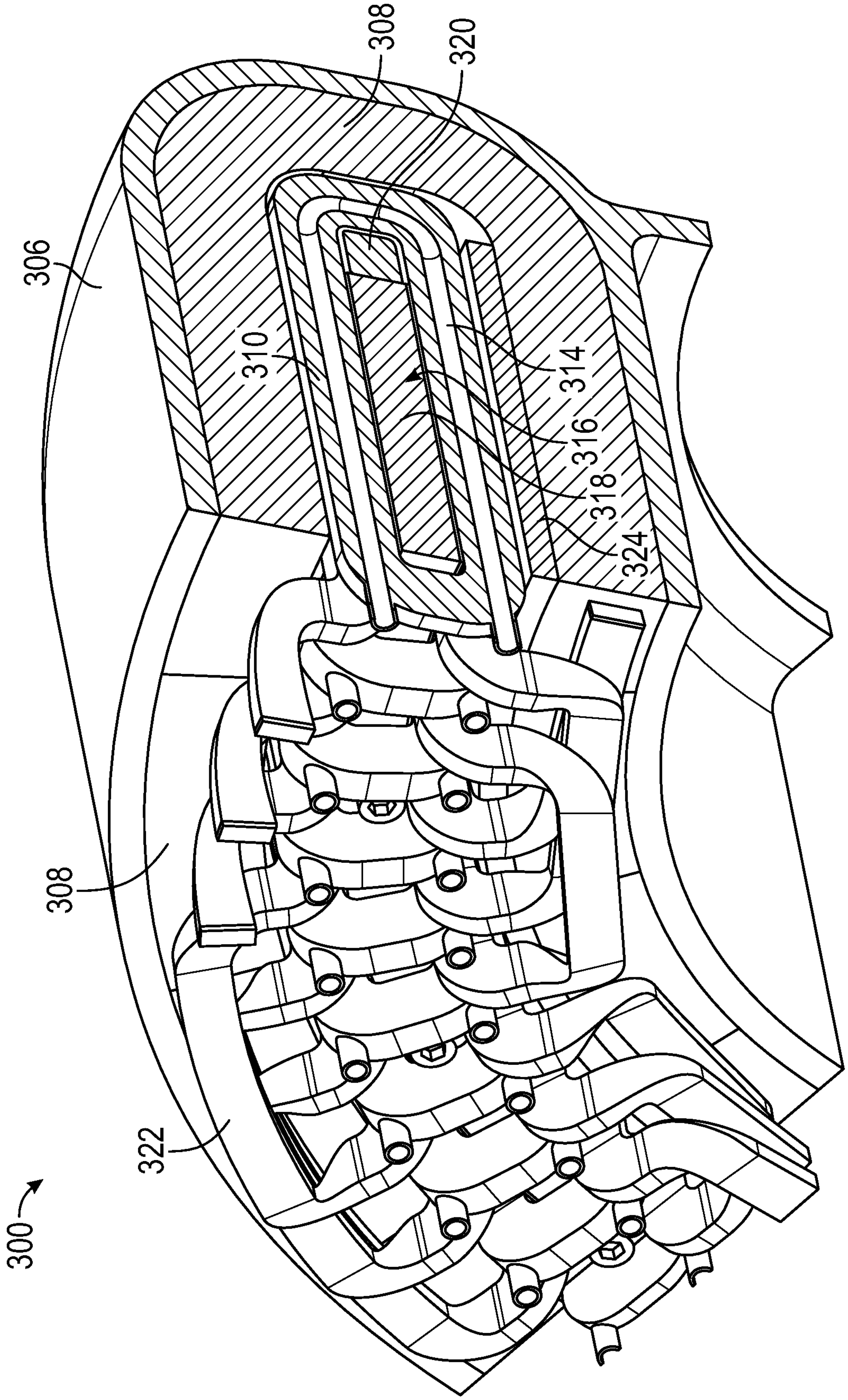
FIG. 3B is a schematic illustration of the rotor and stator of FIG. 3A as arranged within a rotor sleeve in accordance with an embodiment of the present disclosure.

Referring now to FIGS. 3A-3B, schematic illustrations of a portion of an aircraft electric motor 300 in accordance with an embodiment of the present disclosure is shown. FIGS. 3A-3B illustrate a portion of a rotor 302 and a stator 304 of the aircraft electric motor 300. FIG. 3A illustrates the rotor 302 and the stator 304 and FIG. 3B illustrates these components arranged within a rotor sleeve 306.

The rotor 302 is formed of a plurality of U-shaped magnets 308. In some configurations, the plurality of magnets 308 can be arranged with alternating polarity in a circular structure. Arranged within the "U" of the U-shaped magnets 308 is the stator 304. The stator 304 is formed of a plurality of windings 310. In this configuration, the windings 310 are arranged with a header 312. The header 312 may be part of a cooling system, such as that shown and described above. The header 312 can be configured to cycle a working fluid through cooling channels 314 for cooling of the windings 310, as shown in FIG. 3B.

The windings 310 may be wrapped about a support structure 316 (e.g., back iron or yoke). The support structure 316, in some embodiments and as shown in FIG. 3B, may include a laminate portion 318 and a magnetic portion 320. In some such embodiments, the laminate portion 318 may be formed from cobalt steel laminate and the magnetic portion 320 may be formed from a soft magnetic composite. The laminate portion 318 may be provided to capture in-plane flux from outer and inner rotor. The magnetic portion 320 may be provided to capture end rotor flux and may take a shape/filler in a gap through the end turns of the coil. The windings 310 include end connections 322 and may be electrically connected to one or more power module systems of the aircraft electric motor, such as shown above.

As shown in FIG. 3B, the magnets 308 are U-shaped and arranged within the rotor sleeve 306. The rotor sleeve 306 is a substantially U-shaped sleeve that is sized and shaped to receive the U-shaped magnets 308. In this illustrative configuration, the rotor sleeve 306 can include an inner sleeve 324. The inner sleeve 324 may be configured to provide support to a portion of the magnets 308. It will be appreciated that there is no direct contact between the windings 310 and the magnets 308. This lack of contact allows for free rotation of the rotor 302 relative to the stator 304 during operation.

In aviation-class electric motors, such as shown and described above, a high-power density can be achieved by maximizing torque at a given speed. The torque density can be increased by improving utilization of magnetic materials and increase magnetic loading. Prior concepts for maximizing power density was achieved through minimizing the core of the rotor system. However, such minimization has an impact on magnetic loading (average airgap flux density). Conventionally, introducing a magnetic tooth can increase magnetic loading but may also increase torque ripple. Torque ripple is an effect seen in electric motor designs and refers to a periodic increase or decrease in output torque as the motor shaft rotates. Accordingly, it is desirable to both maximize magnetic loading while minimizing torque ripple. In view of this, embodiments of the present disclosure are directed to incorporating non-magnetic teeth and/or non-magnetic back iron, yoke, or support structure within the motor assembly. The non-magnetic structures (teeth and/or support structure) are made from non-magnetic materials (e.g., potting material, ceramic, etc.) may be infused or embedded with magnetic wires In accordance with embodiments of the present disclosure, the introduction of magnetic wire-infused teeth and/or support structures results in reduced weight and improved power density. Further, advantageously, such configurations can provide a low weight solution without sacrificing average torque of the motor. Shaping of the wires near an airgap (e.g., to the magnets of the motor) can also help manipulate the harmonics in the airgap and result in redistribution of torque ripple harmonics and reduce torque ripple without impacting average torque.

Figure 4A:
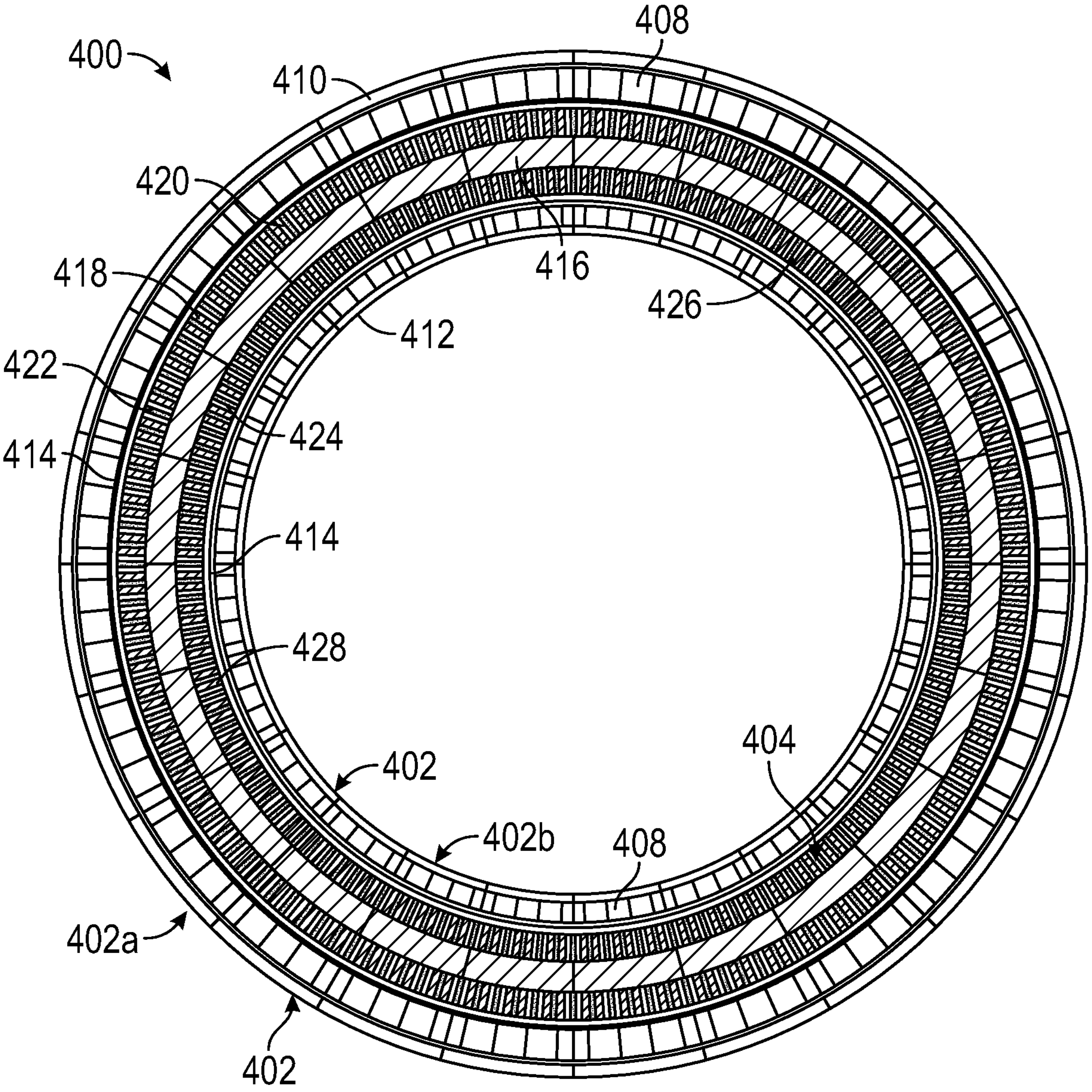
FIG. 4A is a schematic illustration of a radial cross-section of an aircraft electric motor in accordance with an embodiment of the present disclosure.
Figure 4B:
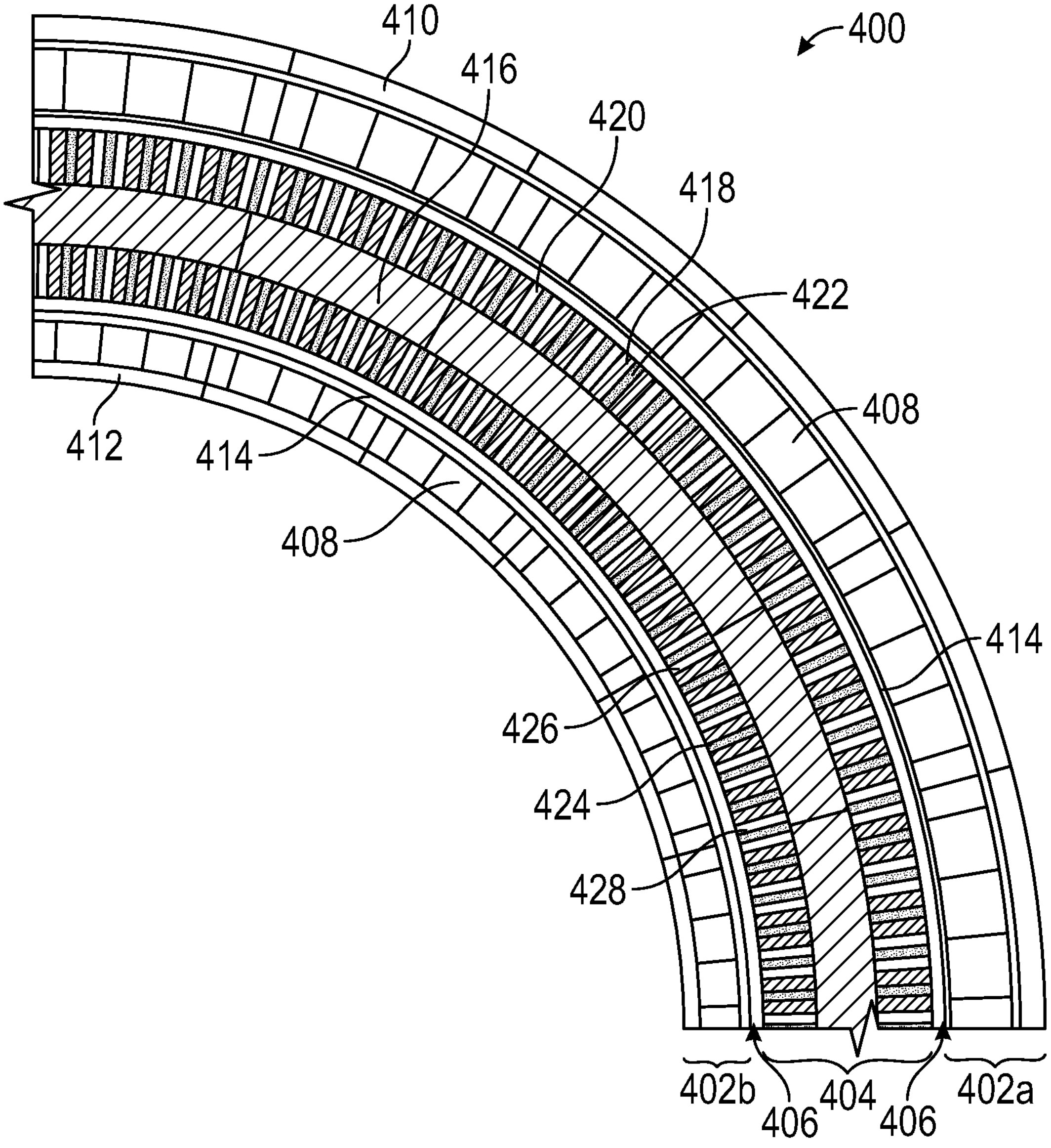
FIG. 4B is an enlarged illustration of a portion of the structure shown in FIG. 4A.

Referring to FIGS. 4A-4B, schematic illustrations of a portion of an aircraft electric motor 400 in accordance with an embodiment of the present disclosure is shown. FIGS. 4A-4B illustrate a portion of a rotor 402 and a stator 404 of the aircraft electric motor 400. FIG. 4A illustrates the full circular structure of the rotor 402 and the stator 404 and FIG. 4B illustrates an enlarged illustration of a portion of the rotor 402 and the stator 404. The rotor 402 and the stator 404 may be part of an aircraft electric motor similar to that shown and described herein and used as described herein.

As shown, the rotor 402 is arranged about the stator 404, with an outer portion 402*a* and an inner portion 402*b* arranged radially outward and inward from the stator 404, respectively. The outer and inner portions 402*a*, 402*b* may be parts of a substantially U-shaped magnet assembly, as shown and described above. The stator 404 is arranged between the outer and inner portions 402*a*, 402*b* with an airgap 406 therebetween, as shown in FIG. 4B. The rotor 404 includes a plurality of magnets 408, which may be substantially U-shaped and span from the outer portion 402*a* to the inner portion 402*b*. An outer rotor sleeve 410 and an inner rotor sleeve 412 may be separate components or a continuous structure, as shown and described above, and are configured to support and retain the magnets 408 of the rotor 402. Further, one or more retention sleeves 414 may be arranged on a side of the magnets 408 that faces the stator 404. The rotor 402 is configured to be rotationally driven by current that is passed through the stator 404.

The stator 404 includes a support structure 416 (e.g., a back iron or yoke). The support structure 416 supports, on a radial outer side thereof, a plurality of outer teeth 418, outer coils 420, and outer cooling channels 422. Similarly, on a radially inner side of the support structure 416 are arranged a plurality of inner teeth 424, inner coils 426, and inner cooling channels 428.

In some embodiments of the present disclosure, one or more of the outer teeth 418, the inner teeth 424, and/or the support structure 416 may be made of a non-magnetic material with embedded magnetic wires. In some example embodiments, each of the outer teeth 418 the inner teeth 424, and/or the support structure 416 may be formed of a non-magnetic material with embedded magnetic wires and shaped to reduce torque ripple while increasing magnetic loading and improving manufacturability and address stack-up tolerance challenges.

As shown in FIG. 4A, the rotor 402 and stator 404 form a substantially ring-shape or annular shape. As shown, the outer teeth 418 and the inner teeth 424 are each arranged in a circumferential arrangement and extend radially from the support structure 416. The outer teeth 418 extend radially outward from the support structure 416 and the inner teeth 424 extend radially inward from the support structure 416. In some configurations, the teeth 418, 424 may be the same in shape, orientation, material, and the like about the circumferences of the stator 404. In other embodiments, the teeth 418, 424 may be arranged in sets or specific configurations arranged in a repeating pattern about the respective circumferential arrangement.

Figure 5A:
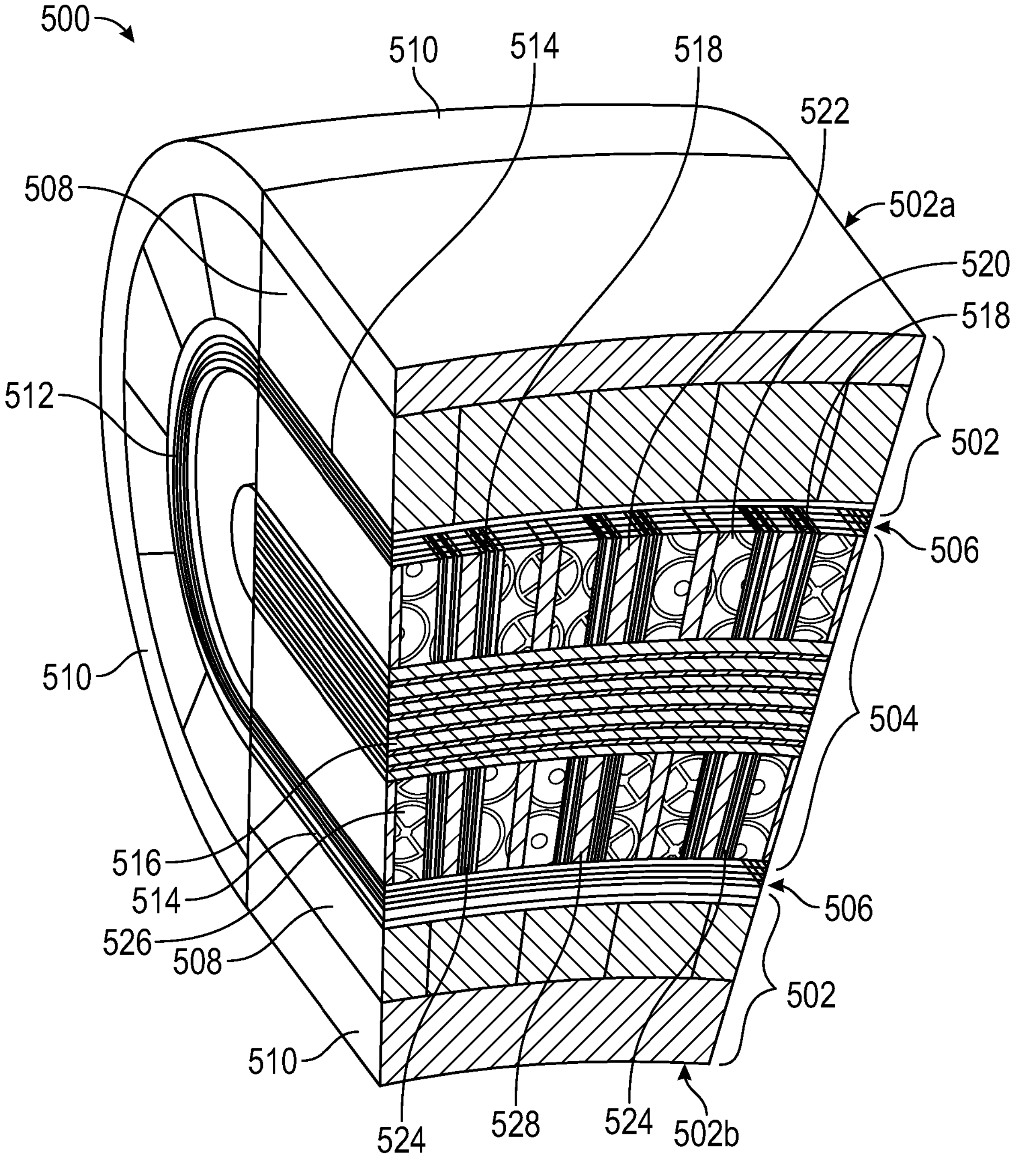
FIG. 5A is a schematic illustration of a portion of an electric motor in accordance with an embodiment of the present disclosure.
Figure 5B:
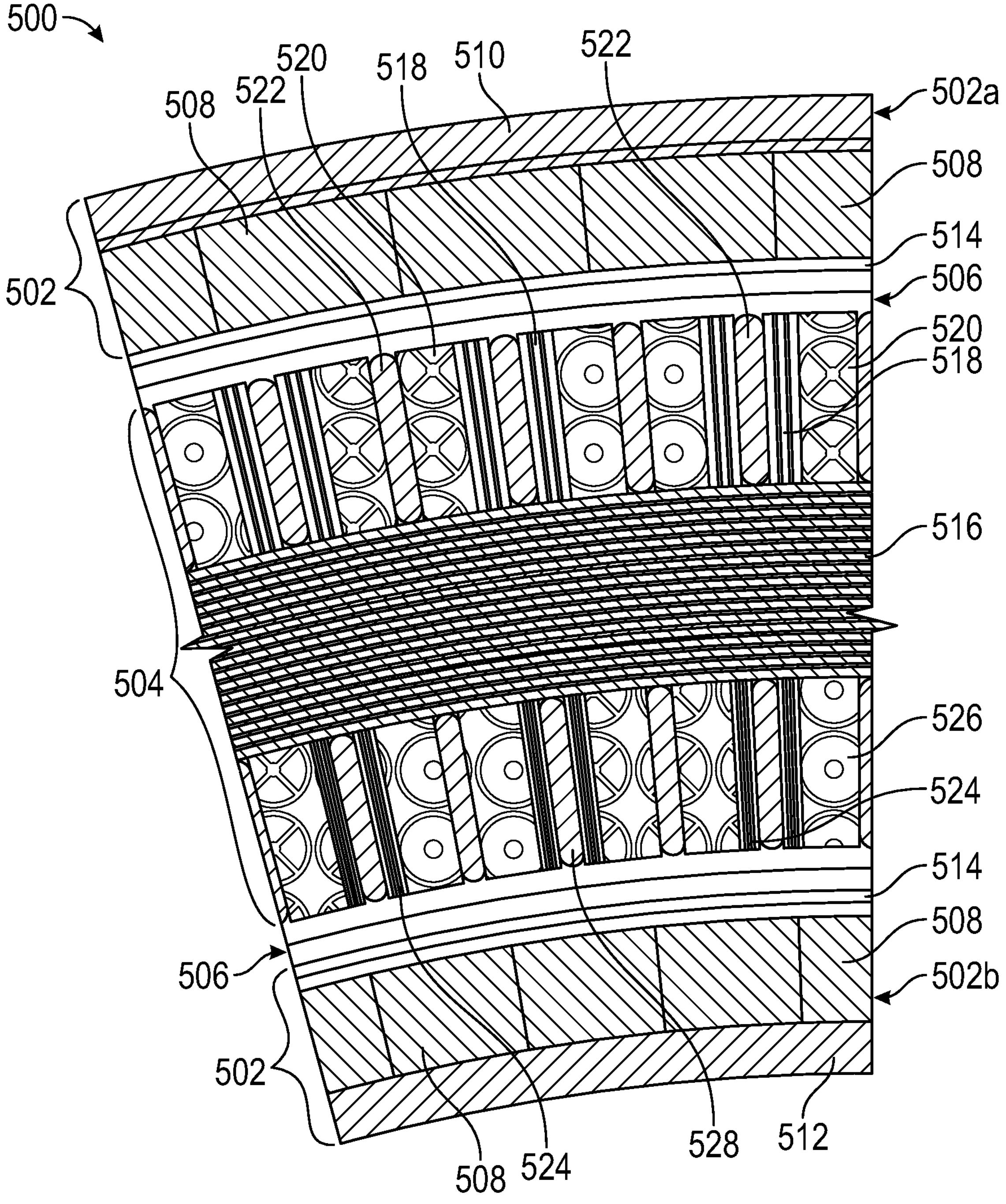
FIG. 5B is another view of the portion of the electric motor shown in FIG. 5A.

Referring now to FIGS. 5A-5B, schematic illustrations of a portion of an electric motor 500 in accordance with an embodiment of the present disclosure are shown. FIG. 5A is a perspective, cross-sectional view of the portion of the electric motor 500 and FIG. 5B is a cross-sectional view illustrating internal features of the electric motor 500. The electric motor 500 may be configured and incorporated into systems similar to those described here. The portion of the electric motor 500 shown in FIGS. 5A-5B includes a rotor 502 the is configured to rotate about a stator 504.

As shown, the rotor 502 is arranged about the stator 504, with an outer portion 502*a* and an inner portion 502*b* arranged radially outward and inward from the stator 504, respectively. The outer and inner portions 502*a*, 502*b*, as shown, are parts of a substantially U-shaped magnet assembly. The stator 504 is arranged between the outer and inner portions 502*a*, 502*b* with an airgap 506 therebetween. The rotor 504 includes a plurality of magnets 508, which may be substantially U-shaped and span from the outer portion 502*a* to the inner portion 502*b*. An outer rotor sleeve 510 and an inner rotor sleeve 512 are configured to support and retain the magnets 508 of the rotor 502. Further, one or more retention sleeves 514 may be arranged on a side of the magnets 508 that faces the stator 504. The rotor 502 is configured to be rotationally driven by current that is passed through the stator 504.

The stator 504 includes a support structure 516 (e.g., a back iron or yoke). The support structure 516 supports, on a radial outer side thereof, a plurality of outer teeth 518, outer coils 520, and outer cooling channels 522. Similarly, on a radially inner side of the support structure 516 are arranged a plurality of inner teeth 524, inner coils 526, and inner cooling channels 528. In accordance with some embodiments of the present disclosure, the outer teeth 518 may be placed in-between the coils (conductor with insulation) and microchannels. The whole stator section is then potted with suitable materials to provide structural rigidity and the integrated and combined stator structure is held in place with an external structural distributor.

Conventional stator components are formed from magnetic materials and may be formed from laminates, sintered additive manufacturing, and/or soft magnetic composite materials. These conventional configurations have been designed to focus on core minimum or air-core, which has an impact on magnetic loading (e.g., average airgap flux density) and thereby overall torque/power density. For example, a conventional stator not only provides provide flux path through soft magnetic material but also housing to the coils and laminations and thus requires structural rigidity to transfer reaction forces to a structural ground (e.g., physical structures to which there is a transfer of mechanical loads/forces/vibrations from the stationary components). Accordingly, using these magnetic-material tooth and yoke/back iron results in increased magnetic loading and increased weight to provide the necessary structural support.

To reduce such magnetic loading and for other benefits and purposes, in accordance with embodiments of the present disclosure, the outer teeth 518, the inner teeth 524, and/or the support structure 516 may be formed from a combination of non-magnetic material with magnetic wires embedded therein. The embedded magnetic wires may be formed from silicon steel (e.g., 3.2% silicon steel, 6.5% silicon steel), cobalt steel, soft magnetic materials (e.g., Fe—Si or Fe—Co based electrical steel, amorphous, or nano crystalline based soft magnetic materials, etc.) or other magnetic materials. In accordance with some embodiments, because of the directed magnetic flux being conceded with the long axis direction of the magnetic wire and with the circumference tangential direction with respect to the yoke, grain orientated electric steel can be used in some configurations. These magnetic wires may be embedded in non-magnetic material(s), including, without limitation, ceramics, potting, and/or other structural materials (e.g., epoxy resin, polyurethane potting, encapsulation compounds, etc.). Embodiments of the present disclosure employ magnetic wires to form a high permeable flux path. Additionally, in accordance with some embodiments of the present disclosure, structural loads are transferred through the micro channels of the motor system, and the soft magnetic material, described herein, may not bear mechanical loads.

In FIGS. 5A-5B, the layers or laminations of the embedded magnetic wires in the teeth 518, 524 are arranged to extend radially. That is, in the illustrative configuration, referring to the features of the teeth 518, 524 as layered structures, the layers of magnetic and non-magnetic material extend in a direction from a radially inward point to a radially outward point. However, the orientation of the layered structures of the teeth 518, 524 may be different than that illustrated. For example, the orientation may be that the layers are stacked at different radial positions (i.e., circumferential orientation and stacked in a radial direction). Still further, in some configurations, the layers may be oriented such that the layers define planes parallel with respect to the page of FIG. 5B and then stacked inward and outward from the page. As such, it is to be appreciated that the orientation, layering, and structure of the teeth 518, 524, as formed in accordance with embodiments of the present disclosure may take various different configurations. For example, the orientation and arrangement of the layers of the teeth 518, 524 may be configured to reduce or minimize Eddy current losses.

Figure 6:
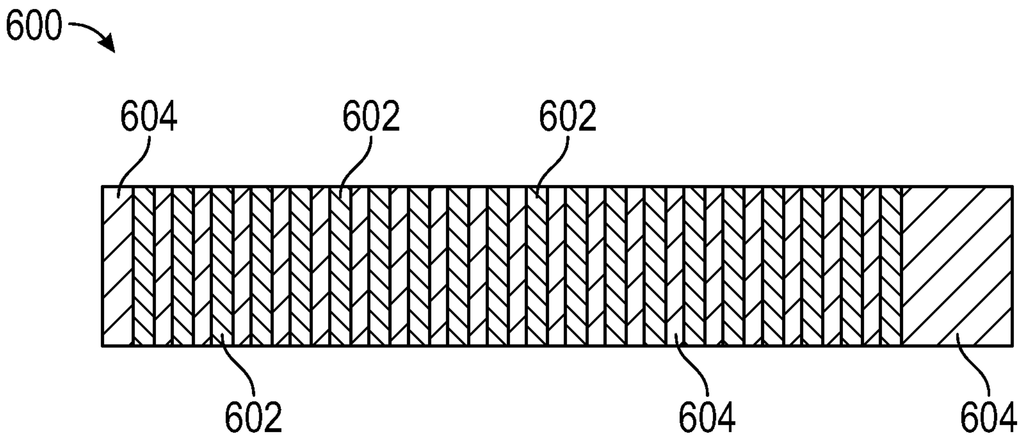
FIG. 6 is a schematic illustration of a portion of a stator structure in accordance with an embodiment of the present disclosure.

Referring now to FIG. 6, a schematic illustration of a portion of a stator structure 600 in accordance with an embodiment of the present disclosure. The stator structure 600 may be configured as a tooth of a stator (e.g., inner or outer teeth) and/or as a portion as part of a support structure (e.g., yoke, back iron). The stator structure 600 includes a plurality of magnetic wires 602 embedded within a non-magnetic material 604. In this embodiment, the magnetic wires 602 are flat strips of magnetic material with the non-magnetic material 604 being arranged between adjacent magnetic wires 602. The non-magnetic material 604 provides structural rigidity and strength to the stator structure 600. In some embodiments, the non-magnetic material 604 is arranged to prevent contact between adjacent magnetic wires 602.

Figure 7:
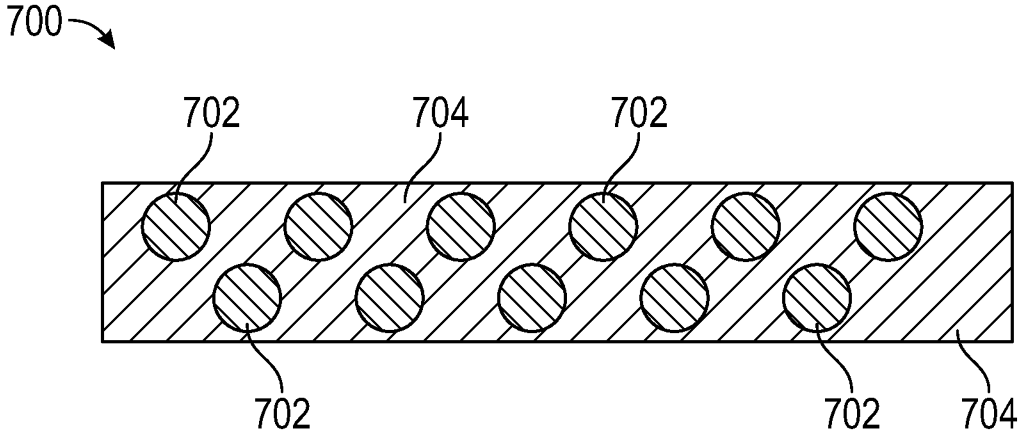
FIG. 7 is a schematic illustration of a portion of a stator structure in accordance with an embodiment of the present disclosure.

Referring now to FIG. 7, a schematic illustration of a portion of a stator structure 700 in accordance with an embodiment of the present disclosure. The stator structure 700 may be configured as a tooth of a stator (e.g., inner or outer teeth) and/or as a portion as part of a support structure (e.g., yoke, back iron). The stator structure 700 includes a plurality of magnetic wires 702 embedded within a non-magnetic material 704. In this embodiment, the magnetic wires 702 are wires having circular cross-section, as shown in FIG. 7, of magnetic material with the non-magnetic material 704 being arranged around the magnetic wires 702. The non-magnetic material 704 provides structural rigidity and strength to the stator structure 700. In some embodiments, the non-magnetic material 704 is arranged to prevent contact between adjacent magnetic wires 702.

In each of the stator structures 600, 700, the density of magnetic wires may be up to 90% green density (volume fraction). The maximum of 90% green density is set to ensure that there is a minimum amount of insulating material between adjacent wires (e.g., separation) and a minimum amount of material required to achieve desired insultation properties. In accordance with embodiments of the present disclosure, conventional magnetic-material teeth and/or structural supports (e.g., yoke/back iron) is replaced by a combination of non-magnetic material with embedded magnetic wires. This combination of features provides for reduced weight, as the entire tooth or support structure is not made from a magnetic (metal) material, but rather, lighter materials may be used for the non-magnetic material that supports and contains the magnetic wires.

The non-magnetic material may be a porous material that allows for insertion or embedding of the magnetic wires. As shown in each of FIGS. 6-7, the stator structures 600, 700 have a generally rectangular cross-sectional shape. In a non-limiting example, the long (horizontal in FIGS. 6-7) dimension of such stator structures 600, 700 may be 5-20 mm and the short (vertical in FIGS. 6-7) dimension of such stator structures 600, 700 may be 0.5 to 1.0 mm. In some embodiments the length of the magnetic wires and the non-magnetic material may be substantially the same to ensure that the wire can fully extend between a yoke and a permanent magnet of the motor system. In the configuration of FIG. 6 (i.e., flat wires), the wire or ribbon-like structure may have a thickness of 20 m to 100 m. In the configuration of FIG. 7 (i.e., round wires), the wire structure may have a diameter of 20 m to 100 m, and the diameter, in some embodiments, may be selected to be no more than 80% of a thickness of the non-magnetic material portion, to ensure that each wire is captured and enclosed within the non-magnetic material portion.

It will be appreciated that the above described embodiments are merely for illustrative and explanatory purposes and are not intended to be limiting to the specific components and arrangements described and shown. For example, various electric motors that incorporate embodiments of the present disclosure can include features not explicitly shown, such as cooling systems, power systems, retention sleeves, components coupled to and driven by output shafts, and the like. Further, it will be appreciated that the specific arrangement of magnet segments, teeth, windings, cooling channels, and the like may be varied depending on the specific application, including where gaps or spaces (e.g., no magnet present along a portion of a shell) in the arrangement of magnets may be selected to achieve a desired torque or based on other considerations as will be appreciated by those of skill in the art.

Figure 8:
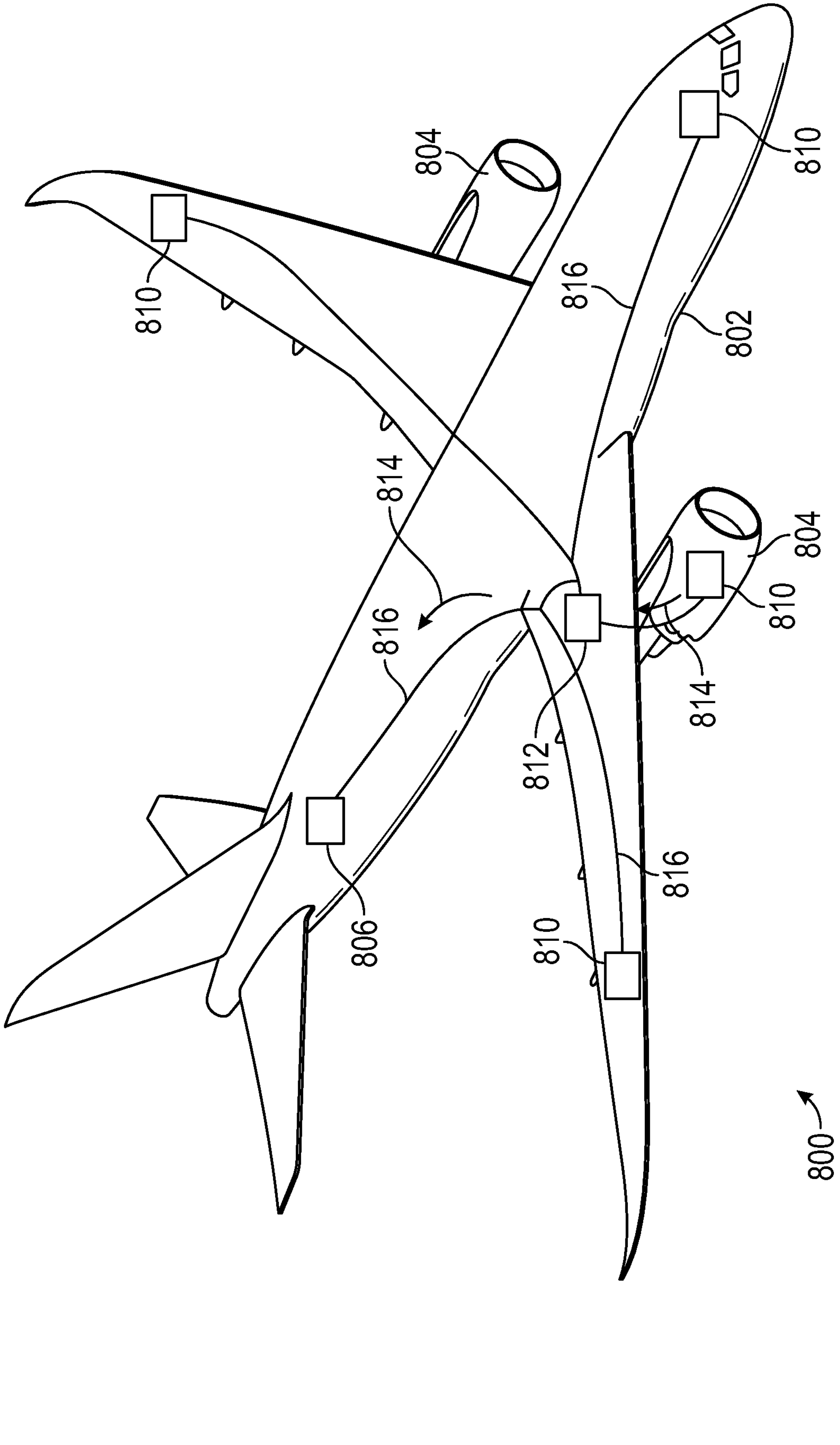
FIG. 8 is a schematic view of a power system of an aircraft that may employ embodiments of the present disclosure.

Referring now to FIG. 8, a power system 800 of an aircraft 802 is schematically shown. The power system 800 includes one or more engines 804, one or more electric motors 806, a power bus electrically connecting the various power sources 804, 806, and a plurality of electrical devices 810 that may be powered by the engines 804 and/or motors 806. The power system 800 includes a power distribution system 812 that distributes power 814 through power lines or cables 816. The electric motors 806 be configured as the aircraft electric motors shown and described herein and/or incorporate features as described herein.

Advantageously, embodiments of the present disclosure provide for improved electric motors for aircraft and aviation applications. The aircraft electric motors of the present disclosure provide for improved power density electric machines by increasing magnetic loading while minimizing torque ripple. Further, by eliminating fully metal/magnetic teeth/support structure and incorporating the embedded magnetic wires in non-magnetic material can achieve improved manufacturability. Furthermore, embodiments of the present disclosure may have a reduced weight as compared to conventional systems and provide additional benefits for aircraft applications. As noted, torque ripple may be reduced through inclusion of the embedded magnetic wires described herein, and such systems may be suited for high torque density applications. Furthermore, by including such embedded magnetic wires in non-magnetic material, enhanced torque density may be achieved on the outer rotor side.

The terms "about" and "substantially" are intended to include the degree of error associated with measurement of the particular quantity based upon the equipment available at the time of filing the application. For example, "about" or "substantially" can include a range of ±8% or 5%, or 2% of a given value. The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure is not limited to the particular embodiment disclosed as the best mode contemplated for carrying out this present disclosure, but that the present disclosure will include all embodiments falling within the scope of the claims.

What is claimed is:

1. An aircraft electric motor comprising:

a rotor comprising an outer portion and an inner portion arranged radially outwardly and inwardly respectively, wherein the outer portion and inner portion are parts of a substantially U-shaped magnet assembly including a plurality of U-shaped magnet segments arranged on a frame of the rotor;

an output shaft operably coupled to the rotor; and a stator arranged between the outer portion and the inner portion of the rotor with an airgap therebetween, the stator comprising a support structure and at least one winding wrapped about a plurality of stator teeth comprising inner teeth arranged on a radially inward side of the support structure and outer teeth arranged on a radially outward side of the support structure;

wherein at least one of the inner teeth, the outer teeth, or the support structure is formed from a non-magnetic material with embedded magnetic wires.

2. The aircraft electric motor of claim 1, wherein each of the inner teeth, the outer teeth, and the support structure are formed from a non-magnetic material with embedded magnetic wires.

3. The aircraft electric motor of claim 1, wherein the embedded magnetic wires comprise a silicon steel.

4. The aircraft electric motor of claim 3, wherein the silicon steel has a composition of one of 3.2% silicon steel or 6.5% silicon steel.

5. The aircraft electric motor of claim 1, wherein the embedded magnetic wires comprise a cobalt steel.

6. The aircraft electric motor of claim 1, wherein the non-magnetic material comprises at least one of a ceramic or a potting material.

7. The aircraft electric motor of claim 1, wherein the wires are flat strips of magnetic material.

8. The aircraft electric motor of claim 7, wherein the flat strips have a thickness of between 20 μm and 100 μm.

9. The aircraft electric motor of claim 1, wherein the wires have a circular cross-sectional profile.

10. The aircraft electric motor of claim 9, wherein the wires have a diameter of between 20 μm and 100 μm.

11. The aircraft electric motor of claim 9, wherein the wires have a diameter of 80% or less than a thickness of the non-magnetic material.

12. The aircraft electric motor of claim 1, wherein the non-magnetic material with embedded magnetic wires is formed as a stator structure having a rectangular cross-section.

13. The aircraft electric motor of claim 12, wherein the rectangular cross-section has a width of 10 mm and a height of between 0.5 mm and 10 mm.

14. The aircraft electric motor of claim 1, wherein the non-magnetic material with embedded magnetic wires is formed as a stator structure that comprises wires having a green density of 90% or less of a respective the formed stator structure structured.

15. An aircraft comprising:

at least one aircraft electric motor;

at least one electrical device; and a power distribution system configured to distribute power from the at least one electric motor to the at least one electrical device, wherein the at least one aircraft electric motor comprises:

a rotor comprising an outer portion and an inner portion arranged radially outwardly and inwardly respectively, wherein the outer portion and inner portion are parts of a substantially U-shaped magnet assembly including a plurality of U-shaped magnet segments arranged on a frame of the rotor;

an output shaft operably coupled to the rotor; and a stator arranged between the outer portion and the inner portion of the rotor with an airgap therebetween, the stator comprising a support structure and at least one winding wrapped about a plurality of stator teeth comprising inner teeth arranged on a radially inward side of the support structure and outer teeth arranged on a radially outward side of the support structure, wherein at least one of the inner teeth, the outer teeth, or the support structure is formed from a non-magnetic material with embedded magnetic wires.

16. The aircraft of claim 15, wherein each of the inner teeth, the outer teeth, and the support structure are formed from a non-magnetic material with embedded magnetic wires.

17. The aircraft of claim 15, wherein the embedded magnetic wires comprise at least one of a silicon steel or a cobalt steel.

18. The aircraft of claim 15, wherein the non-magnetic material comprises at least one of a ceramic or a potting material.

19. The aircraft of claim 15, wherein the wires are one of (i) flat strips of magnetic material or (ii) wires having a circular cross-sectional profile.

20. An aircraft electric motor comprising:

a rotor comprising an outer portion and an inner portion arranged radially outwardly and inwardly respectively, wherein the outer portion and inner portion are parts of a substantially U-shaped magnet assembly including a plurality of U-shaped magnet segments arranged on a frame of the rotor;

an output shaft operably coupled to the rotor; and a stator arranged between the outer portion and the inner portion of the rotor with an airgap therebetween, the stator comprising a support structure and at least one winding wrapped about a plurality of stator teeth comprising inner teeth arranged on a radially inward side of the support structure and outer teeth arranged on a radially outward side of the support structure;

wherein at least one of the inner teeth and the outer teeth are formed from a non-magnetic material with embedded magnetic wires;

wherein the wires are flat strips of magnetic material.

* * * * *